United States Patent [19]

Hadley et al.

[11] Patent Number: 4,541,549
[45] Date of Patent: Sep. 17, 1985

[54] AGRICULTURAL HOPPER STRUCTURE

[75] Inventors: Howard C. Hadley, Urbandale; Marvin L. Bigbee, Ankeny, both of Iowa

[73] Assignee: Deere & Company, Moline, Ill.

[21] Appl. No.: 476,886

[22] Filed: Mar. 18, 1983

[51] Int. Cl.$^4$ ............................................. B67D 5/60
[52] U.S. Cl. .................................. 222/143; 222/608; 222/462; 206/504
[58] Field of Search ............... 222/129, 143, 460, 462, 222/173, 608; 206/504; 220/23.4; 215/6; D15/10, 13, 27, 28; 111/73, 74, 75, 80; 296/3

[56] References Cited

U.S. PATENT DOCUMENTS

| | | | |
|---|---|---|---|
| 405,478 | 6/1889 | Hoh | 111/73 |
| 510,711 | 12/1893 | Rowe | 222/511 |
| 2,515,269 | 7/1950 | Shaw | 222/129 |
| 2,968,264 | 1/1961 | Schnell | 222/608 |
| 3,080,096 | 3/1963 | Carfizzi | 206/504 |
| 3,602,400 | 8/1971 | Cooke | 222/185 |
| 3,995,541 | 12/1976 | Coyle et al. | 296/3 |

FOREIGN PATENT DOCUMENTS

| | | | |
|---|---|---|---|
| 1210413 | 3/1960 | France | 222/129 |
| 1269360 | 4/1972 | United Kingdom | 222/129 |

OTHER PUBLICATIONS

International Harvester Operator's Manual, International 6200 Press Drill, p. 14, 1 097 216 R5, 9-82.

Primary Examiner—H. Grant Skaggs
Assistant Examiner—Andrew Jones

[57] ABSTRACT

Agricultural hopper structure for containing two different granular materials such as seed and fertilizer. Two molded plastic containers are nested together and supported on a frame. The nested ends of the containers are concave and convex, respectively, to provide a symmetrical appearance while establishing unequal container capacity. The nested containers include a downwardly directed ledge structure freely resting on a corresponding upwardly facing load-bearing surface of the frame to reduce the number of fixed attaching points. The upper portions of the containers extend above the frame and have outwardly convex sidewalls. The hopper structure is fabricated by first nesting the containers and then lowering the nested containers onto the frame.

46 Claims, 3 Drawing Figures

AGRICULTURAL HOPPER STRUCTURE

BACKGROUND OF THE INVENTION

The present invention relates generally to agricultural hoppers, and more particularly, to agricultural hoppers of the type having separate compartments for two different materials such as seed and fertilizer.

Grain drills, seeders and other similar types of implements often include a hopper having two separate compartments for containing two materials such as seed grain and fertilizer. Such hoppers are commonly fabricated by welding and/or bolting sheet metal panels in a tank configuration on an implement frame. Such are available with adjustable hopper partitions which divide the two compartments and which can be adjusted to vary the relative capacity of the two compartments. The sheet metal construction is relatively expensive, primarily because a relatively long fabrication time is required to assemble the panels on the support frame. Metal hoppers are relatively bulky and heavy and subject to water leakage problems and corrosion, particularly in the compartment which contains the fertilizer. Hopper shapes are limited to those which may be easily formed in the sheet metal. As a result, the hoppers can be less than pleasing to the eye. Tanks with compartments of unequal volume are often unsymmetrical. With some tank construction, inadvertent mixing of two materials is a common problem because of the close proximity of the material input areas for the compartments.

The material outlets for the separate tank compartments are usually spaced in close proximity to each other to accommodate conventional seed and fertilizer metering structure. Bridging and non-free flowing of the material adjacent the compartment outlets is a common problem. In hopper structure where two compartments are joined together, the interface can permit water to drip downwardly into the meter area to cause blockage or corrosion.

SUMMARY OF THE INVENTION

It is therefore an object of the present invention to provide an improved agricultural hopper having two compartments.

It is a further object of the invention to provide an agricultural hopper which is easier and more economical to construct, and which is more attractive and less easily corroded than at least many of the previously available hoppers.

It is yet another object of the invention to provide an agricultural hopper which is easily attached to the support frame and which requires few points of attachment to the frame so that stresses in the hopper are reduced when the hopper is in the loaded condition.

It is a further object of the present invention to provide an agricultural hopper which is easy to fill and which helps avoid inadvertent mixing of two different materials.

It is still another object of the invention to provide an agricultural hopper which is watertight and not easily corroded. It is a further object to provide such a hopper with two individual nesting compartments which eliminate problems of moisture flow at the lower portion of the interface between the two compartments.

It is another object of the invention to provide an agricultural hopper with a pair of molded, nestable compartments of non-equal capacity but symmetrical in appearance when nested.

In accordance with the above objects, an agricultural hopper is fabricated from a pair of complementary molded plastic containers. One of the containers has a convex inner end portion and the other container has a complementary concave inner end portion. The containers nest together to form two compartments of non-equal capacity but which are symmetrical in appearance. The lower portions of the containers funnel downwardly and inwardly to provide free and non-bridging material flow to metering structure centrally located with respect to the nested containers. A support frame connected to the implement structure includes a generally upwardly directed horizontal surface, and the containers are molded with a downwardly directed ledge structure which rests upon the horizontal surface to provide primary support for the hopper. A minimum number of attaching points are provided to eliminate stresses on the plastic containers and to reduce the time required to assemble the hopper onto the frame. The capacity of the portion of the containers above the supported ledge is substantially greater than the capacity below the ledge, and the upper compartment areas include lids which are offset with respect to each other to eliminate inadvertent mixing of two materials. The lids are attached by rubber bands to the compartments to provide positive locking in the closed position and to prevent loss during filling of the compartments. The molded compartments provide an economical hopper structure which is watertight, non-corrosive and attractive. The tops and the sides of the upper portions of the compartments are outwardly convex to conform to a shape which is similar to that when the compartments are fully loaded with material, and by eliminating flat surfaces in these areas, any caving in of the sides when the compartments are empty is eliminated. The hopper support structure provides a funnel effect which requires a minimum of attaching points to the plastic tank for each of assembly and minimum of stress points while creating a stable platform for supporting a container of non-rigid material. The hopper is symmetrical about a joint which shows between the compartments on the exterior surface, but the compartments have different capacity inside because of the convex and concave sidewalls. The tank compartments, formed from cross-linked polyethylene, are assembled and simply lowered onto the support frame as a unit.

These and other objects, features and advantages of the present invention will become apparent to those skilled in the art from the description which follows and from the drawings.

DESCRIPTION OF THE PREFERRED EMBODIMENT

Figure 1:
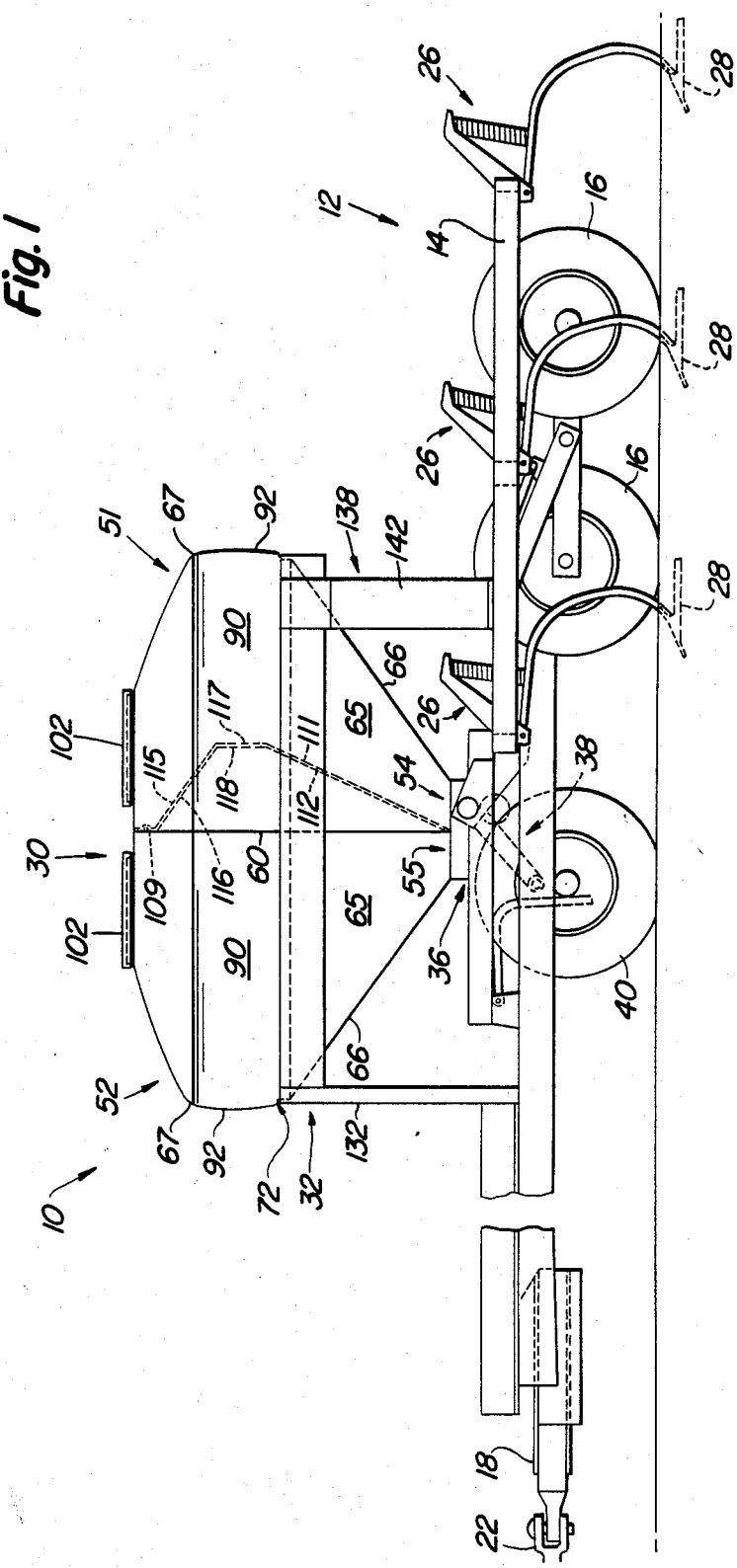
FIG. 1 is a side elevation of the agricultural hopper of the present invention supported on the frame of a seeder.

Referring now to FIG. 1, therein is shown a seeder 10, which includes a chisel plow 12 or other type of tillage tool having a main frame 14 supported for forward motion over the ground by vertically adjustable wheels 16. The seeder 10 includes a forward hitch 18 which is connected to the tillage tool frame 14 and which is adapted for connection to rear hitch structure 22 of a towing vehicle such as a tractor.

Shank assemblies 26 are bolted at transversely spaced locations on the frame and support sweeps 28 forwardly of seed boots or similar other seed and fertilizer placement structure (not shown).

A seed and fertilizer container or hopper 30 is carried on a hopper support frame 32 which, in turn, is mounted on the main frame 14. A metering device 36 is connected to the frame 14 and frame 32. In the preferred embodiment, the metering device 36 contains fluted feed rolls operably connected to a feed wheel drive system which includes a ground-engaging metering wheel 40, which when the wheels 16 are raised to the ground-working position, engages the ground to drive the metering device 36. Seed and/or fertilizer is metered from the hopper 30 to the venturi of an air distribution system (not shown) at a rate dependent upon the forward speed of the seeder 10 over the ground. A conventional air distribution system is utilized to distribute the materials uniformly to the seed boots adjacent the sweeps 28.

Figure 2:
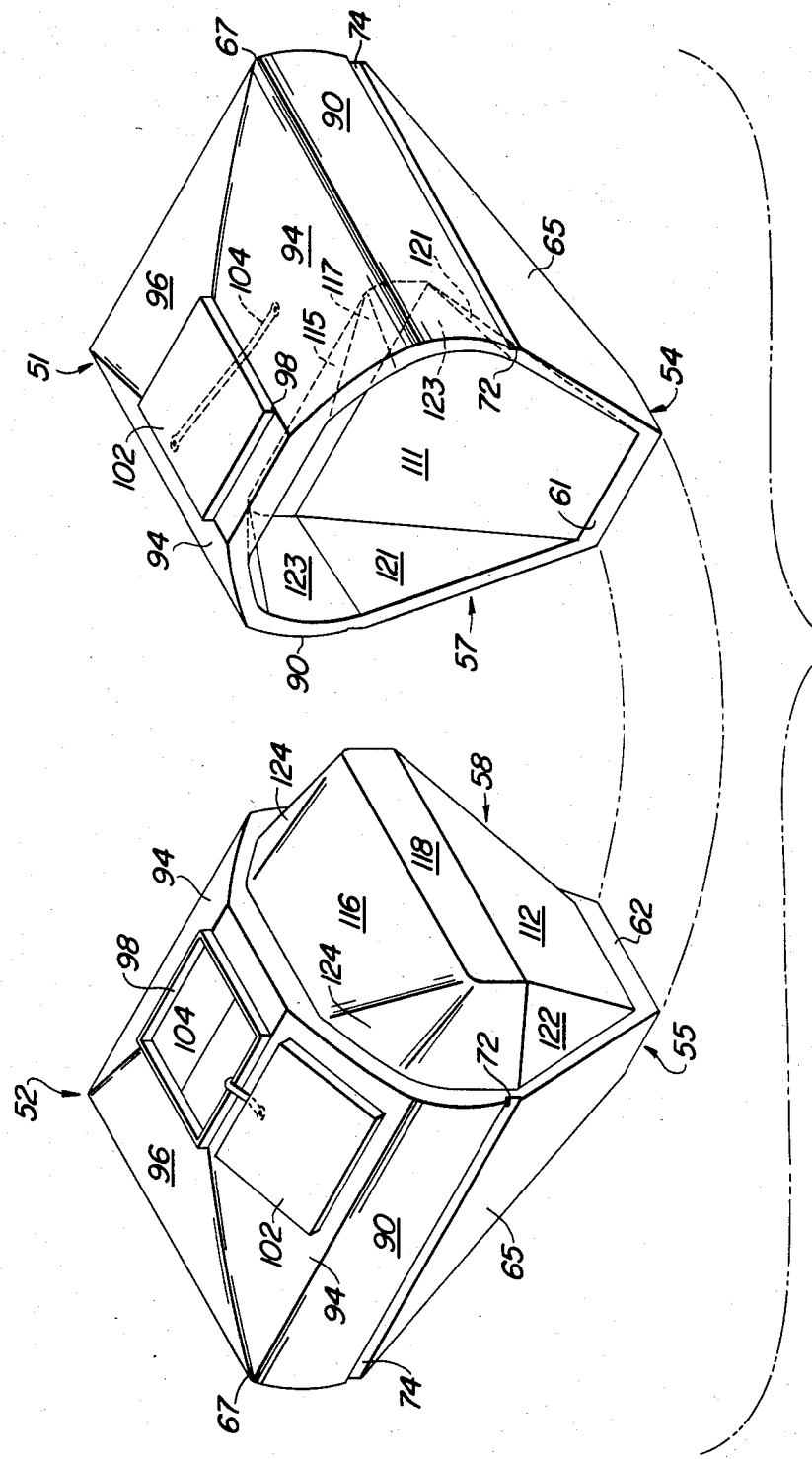
FIG. 2 is a perspective view of the two separate compartments of the hopper of FIG. 1 in a disassembled condition to show the convex and concave inner end walls which nest together.

The seed and fertilizer hopper 30 is assembled from two molded cross-linked polyethylene compartments or containers 51 and 52 which nest together on the support frame 32 and which funnel downwardly toward bottom portions 54 and 55 having first and second material outlets, respectively, opening into the metering device 36 when the hopper 30 is attached to the frame 32. The inner ends 57 and 58 (FIG. 2) have complementary concave and convex portions, respectively, to facilitate nesting of the compartments and to permit the compartments to appear symmetrical while providing a substantially greater capacity in compartment 52 than in the compartment 51. In the preferred embodiment, the capacity of the compartment 52 is about sixty percent of that of the total hopper 30 while the capacity of the compartment 51 is about forty percent.

In the preferred embodiment the outside of the grain container 30 is symmetrical about center line or joint 60 defined by generally planar edges 61 and 62 of the respective ends 57 and 58. Each of the compartments 51 and 52 includes opposite lower sidewalls 65 angled inwardly towards the respective bottom portions 54 or 55. The sidewalls 65 are joined by lower end walls 66 which angle downwardly and inwardly toward the respective bottom portion to form a generally funnel-shaped lower portion below the top of the support frame 32, terminating at the material outlet.

Figure 3:
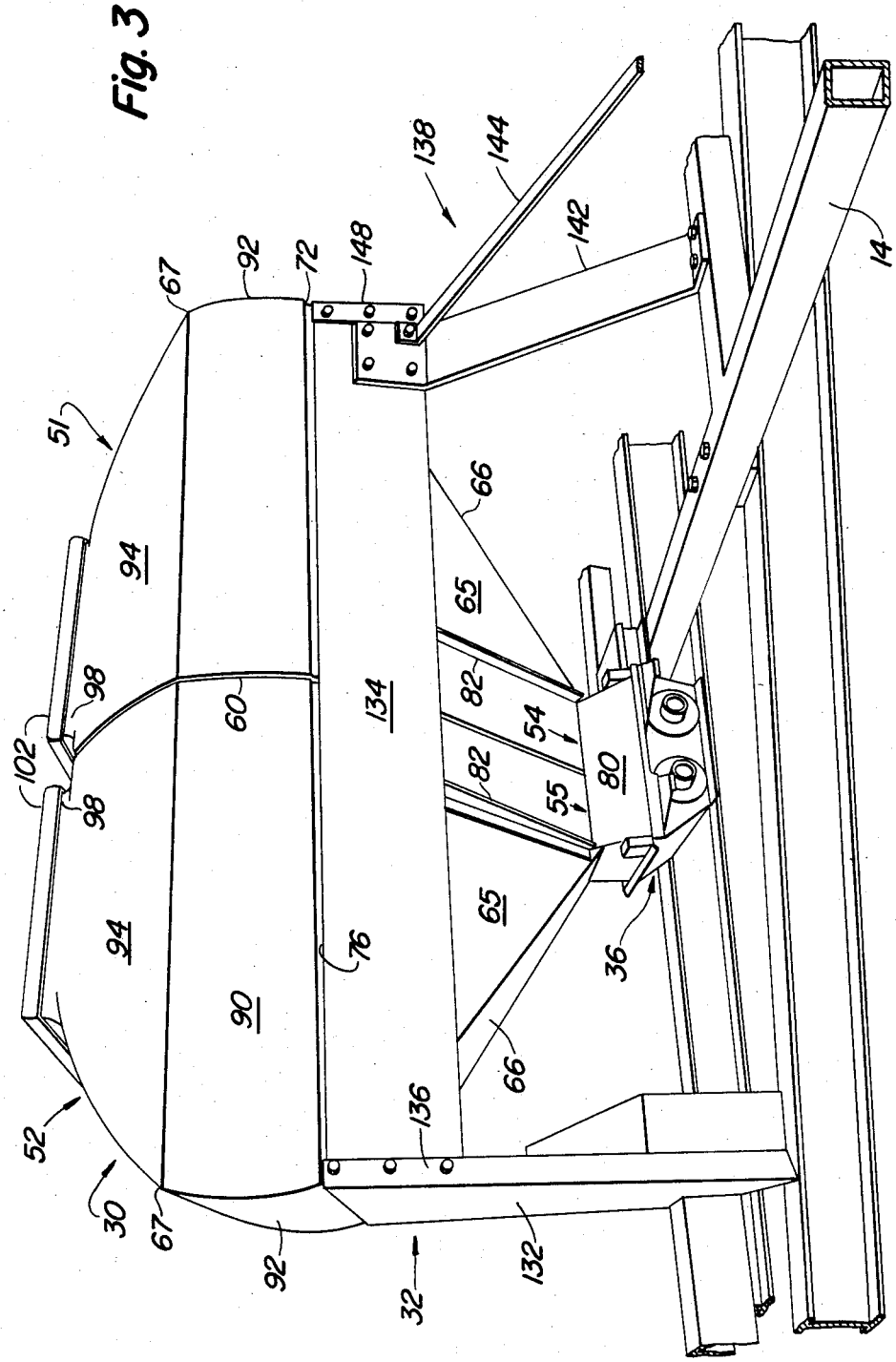
FIG. 3 is a side perspective view, slightly enlarged, of a portion of the hopper and support structure shown in FIG. 1.

The transition area between the lower portions of the nested compartments 51 and 52 and the dome-shaped upper portions 67 includes a generally downwardly facing ledge structure 72 with an outwardly facing edge 74 which extends completely around the nested compartments. In the preferred embodiment the ledge 72 lies substantially in a horizontal plane and rests on a corresponding upwardly facing ledge portion or load-bearing surface 76 of the hopper support frame 32. The compartments 51 and 52 funnel downwardly toward the metering device 36. As best seen in FIG. 3, the lower portions of the compartments 51 and 52 rest on meter support structure 80 and, when the compartments are filled, on angle supports 82 extending between the structure 80 and the support frame 32. Each of the compartments is connected by several bolts to the meter support structure 80. Relatively few attaching points are necessary because of the funnel effect of the compartments 51 and 52 as they rest on the load-bearing surface 76.

The dome-shaped upper portions 67 each include outwardly convex upright sidewalls 90 and end walls 92. Each dome-shaped upper portion 67 is formed from two generally trapezoidal sidewalls 94 and a trapezoidal end wall 96 joined at the top by rimmed opening structure 98 offset outwardly from the edge 61 or 62. The structure 98 provides a generally rectangularly shaped opening for directing seed or fertilizer into the compartment. The openings 98 are spaced apart sufficiently when the compartments 51 and 52 are nested to prevent inadvertent mixing of two materials during filling. Each compartment 98 is closed by a complementary-shaped, removable lid 102 which prevents water from entering the compartment. The lid 102 is attached to one end of a rubber retaining band 104. The opposite end of the band 104 is fixed to the wall 94 so that when the lid 102 is attached as shown on compartment 51 of FIG. 2, the band is stretched to urge the lid toward the right. Complementary lip or bracket structure (not shown) is provided on the left side of the lid 102 and opening 98 to prevent the lid from bouncing or blowing off. For removal, the operator pulls the lid against the bias of the band 104 while lifting it. The band 104 permits the removed lid to rest on the wall 94 just below the opening 98 (see compartment 52 of FIG. 2) while it prevents the lid from moving out of the reach of the operator.

Prior to positioning the compartments 51 and 52 on the load-bearing surface 76 of the hopper support frame 32, rubber seals 109 are inserted between the tops of the edges 61 and 62 and the bottom of the edge to prevent water from running between the inner ends 57 and 58 toward the metering device 36. The compartments 51 and 52 are bolted together at several locations along the edges 61 and 62 so that the compartments 51 and 52 may be lowered together as a unit unto the hopper support frame 32. The inner ends 57 and 58 are so constructed to cooperate with the respective lower end walls 66 to provide free material flow and to prevent bridging of the material therebetween. The concave inner end 57 of the compartment 51 includes a wall 111 facing the lower outer wall 66 which angles inwardly but rises at a relatively steep rate. The corresponding wall 112 of the convex inner end 58 likewise rises steeply. Therefore, the area between the walls 111 and 65 of the compartment 51 is relatively unconstricted so that material can flow freely therebetween, while the area between the wall 112 and the wall 65 of the compartment 52 is not so wide that it causes bridging of the material therebetween. The upper wall 115 of the concave inner end 57 and the corresponding upper wall 116 of the convex inner end 58 slope downwardly toward the right (FIG. 2) sufficiently so that material flow through the opening structure 98 of compartment 51 remains relatively unobstructed. The walls 111 and 112 are joined to their respective edges 61 and 62 by generally triangular sidewalls 121 and 122. Rounded corner portions 123 and 124 conforming generally to the shape of the upper dome portions 67 complete the enclosure of the concave and convex inner ends 57 and 58, respectively.

The slight outward convex shape of the walls 90, 92, 94 and 96 of the dome-shaped upper portion 67 of each compartment maintains the flexible compartments in generally the same shape that they take on when they are completely filled with material. The rounded shape prevents each wall from caving inwardly when material is absent from the container. The hopper 30 is lightweight and attractive, and maintains a symmetrical appearance when the compartments 51 and 52 are nested and supported on the frame 32.

The frame 32 includes a front panel 132 supported by the implement frame 14 and extending upwardly and diverging transversely outwardly therefrom. The upper portion of the front panel 132 forms a portion of the load-bearing surface 76 for supporting the front portion of the hopper ledge structure 72. Side frame structure 134 is bolted to flanges 136 on either side of the panel 132 and extends rearwardly therefrom to rear support structure indicated generally at 138 on either side of the rear portion of the hopper 30. The rear support structure 138 includes a main support bracket 142 bolted to the frame 14 and extending upwardly and transversely inwardly therefrom to the lower portion of the side frame structure 134. A stabilizing brace 144 is also connected to the frame 14 and extends diagonally inwardly therefrom to the side frame structure 134 to provide additional side stability to the frame 32. A flanged rear panel 148 is bolted to the aft end of the frame structure 134 and defines a rear portion of the load-bearing surface 76. The hopper straight frame 32 therefore defines a generally open, rectangularly shaped, box-like structure with a substantially level top surface defining the load-bearing surface 76 for providing good support for the compartments 51 and 52. The assembled compartments 51 and 52 are easily insertable into the support frame 32 with the downwardly directed ledge structure 72 resting upon the surface 76 of the frame 32.

Having described the preferred embodiment, it will be apparent that modifications can be made without departing from the scope of the invention as defined in the accompanying claims.

I claim:

1. For an agricultural implement having upwardly facing load-bearing structure, hopper structure for containing two materials, said hopper structure adapted for support by the load-bearing structure and comprising:
    a first molded flexible container having an outer end wall, an opposite inner end including a concave wall substantially closing the opposite end, and sidewalls connecting the end wall and inner end and defining a funnel-shaped lower portion extending downwardly to a first lower material outlet;
    a second molded flexible container having an outer end wall and an opposite inner end including a convex wall of shape complementary to the concave wall of the first container to permit nesting of said containers, and sidewalls connecting the end wall and inner end of the second container and defining a funnel-shaped lower portion extending downwardly to a second lower material outlet; and
    wherein said containers each include an upper portion and a transition area connected between the upper portion and the funnel-shaped lower portion, said transition area including downwardly directed structure adapted for receipt upon the load-bearing surface, when said containers are nested, to provide primary support for said nested containers, wherein said downwardly directed structure is adapted to freely rest on the load-bearing surface to thereby permit the nested containers to flex at the same time said primary support is provided.

2. The invention as set forth in claim 1 wherein the containers are plastic.

3. The invention as set forth in claim 1 wherein the nested containers define an upright joint adjacent the inner ends, the nested containers are symmetrical with respect to the joint, and the material-containing capacity of the second container is substantially greater than that of the first container.

4. The invention as set forth in claim 3 wherein the first and second outlets are juxtaposed on opposite sides of the joint.

5. The invention as set forth in claim 3 wherein the outer end walls include lower end walls inclined inwardly toward the respective material outlets.

6. The invention as set forth in claim 1 wherein the upper portions include outwardly convex upright walls extending upwardly from the transition areas.

7. The invention as set forth in claim 6 wherein the capacity of the portion of the containers above the downwardly directed structure is substantially greater than the capacity below said structure.

8. The invention as set forth in claim 2 wherein the containers are fabricated from cross-linked polyethylene.

9. In an agricultural implement having a main frame, container structure for containing granular material, said container structure comprising:
    a support frame connected to the main frame and extending upwardly therefrom to a horizontal portion lying substantially in a horizontal plane, the support frame opening inwardly and downwardly from the horizontal portion; and
    a flexible hopper including a lower funnel-shaped portion and an upper container portion having a material-containing capacity substantially greater than the funnel-shaped portion, said flexible hopper including a downwardly directed ledge portion located between the upper and lower container portions and supported on the horizontal frame portion with the lower portion extending downwardly through the support frame opening, and wherein the upper container portion has upright sidewalls, the sidewalls being concave outwardly to approximate the shape of said upper container portion when filled with material.

10. The invention as set forth in claim 9 further including meter support structure located on the main frame and wherein the funnel-shaped portion includes a bottom portion connected to the meter support structure.

11. The invention as set forth in claim 9 wherein the ledge portion freely rests on the horizontal portion thereby permitting the hopper to flex while maintaining the upper container portion restrained from substantial vertical movement with respect to the implement frame.

12. The invention as set forth in claim 9 wherein the horizontal portion of the support frame is rectangular and the downwardly directed ledge portion has a corresponding rectangular shape.

13. The invention as set forth in claim 9 wherein the flexible hopper comprises first and second nestable compartments having complementary inner ends.

14. The invention as set forth in claim 13 wherein the inner end of the first and second compartments are concave and convex, respectively.

15. The invention as set forth in claim 14 wherein the individual compartments when nested define a connecting joint extending around the hopper and lying substantially in a vertical plane, and wherein the hopper is symmetrical about the joint.

16. The invention as set forth in claim 15 wherein the first compartment has a material-containing capacity substantially less than the second compartment.

17. The invention as set forth in claim 13 wherein the compartments are fabricated from cross-linked polyethylene.

18. The invention as set forth in claim 13 including fastening means connecting the inner ends together.

19. The invention as set forth in claim 9 wherein the upper container portion includes an upwardly opening material inlet, a lid member selectively attachable to the inlet for covering the same, and resilient means for maintaining the lid in position over the inlet when attached thereto and for supporting the lid beside the inlet when removed therefrom.

20. The invention as set forth in claim 19 wherein the material inlet includes a rim and the resilient means comprises a rubber band member tensioned between one side of the lid member and the upper container portion.

21. In an agriculture seeding and fertilizing implement having a frame and metering and distributing structure for applying seed and fertilizer to the soil, container structure for individually containing the seed and fertilizer, and for delivering the same to the metering and distributing structure, said container structure comprising:
- a support frame connected to the implement frame and extending upwardly therefrom to a horizontal ledge portion substantially rectangular in shape and opening downwardly and inwardly, said ledge portion located above and generally centered with respect to the metering structure;
- a first flexible container having an outer end and an opposite inner end including a concave wall substantially closing the opposite end, and sidewalls connecting the ends and defining a funnel-shaped lower portion extending downwardly and converging toward the inner end portion to a first material outlet;
- a second flexible container having an outer end and an opposite inner end including a convex wall of shape complementary to the concave wall of the first container to permit nesting of said containers, and sidewalls connecting the ends of the second container and defining a funnel-shaped lower portion extending downwardly and converging toward the inner end of the second container to a second material outlet; and
- wherein said first and second containers include downwardly directed ledge structure adjacent upper ends of the funnel-shaped lower portions, said ledge structure supporting the containers in nested relationship on the horizontal ledge portion of the support frame with the funnel-shaped portions extending downwardly to the metering structure and the first and second material outlets opening into the metering structure, and wherein the container structure is fabricated by connecting the complementary-shaped inner ends of the containers together and thereafter lowering the connected containers as a unit onto the horizontal ledge portion of the support frame.

22. The invention as set forth in claim 21 wherein the first and second containers are molded from cross-linked polyethylene.

23. The invention as set forth in claim 21 wherein the containers when nested on the support frame define an upright connecting joint, and wherein the container structure is symmetrical about the joint.

24. The invention as set forth in claim 23 wherein the material-containing capacity of the first container is substantially less than that of the second container.

25. The invention as set forth in claim 21 wherein the funnel-shaped portions are fixedly connected to the metering structure adjacent the respective material outlets, said ledge portion being substantially free of attaching points fixing the ledge structure thereto.

26. The invention as set forth in claim 21 wherein the downwardly directed ledge structure of the nested containers defines a generally continuous, rectangularly shaped horizontal ledge conforming to the shape of the horizontal ledge portion.

27. The invention as set forth in claim 26 wherein the downwardly directed ledge structure freely rests on the horizontal ledge portion to prevent substantially vertical movement of the nested containers while permitting the containers to flex thereon.

28. The invention as set forth in claim 27 wherein the containers include upper, dome-shaped portions with outwardly convex walls extending outwardly beyond vertical planes extending through the horizontal ledge portion.

29. The invention as set forth in claim 28 wherein the material-containing capacity of the upper, dome-shaped portions is greater than that of the funnel-shaped portions.

30. The invention as set forth in claim 21 including sealing means located between the nested compartments for preventing moisture from entering the metering structure.

31. In an agricultural implement, hopper structure for containing two materials, said hopper structure comprising:
- an implement mounted support frame;
- a first molded plastic container having an outer end wall, an opposite inner end including a concave wall substantially closing the opposite inner end, and sidewalls connecting the end wall and inner end and defining a funnel-shaped lower portion extending downwardly to a first lower material outlet;
- a second molded plastic container having an outer end wall and an opposite inner end including a convex wall of shape complementary to the concave wall of the first container to permit nesting of said containers, and sidewalls connecting the end wall and inner end of the second container and defining a funnel-shaped lower portion extending downwardly to a second lower material outlet, wherein the molded containers include a downwardly facing ledge portion located adjacent the top of the funnel-shaped portions, and wherein the support frame comprises a corresponding upwardly facing load-bearing surface for receiving the ledge portion thereof and supporting the two containers in nested relationship; and wherein the containers include outwardly convex upright walls extending upwardly from the load-bearing surfaces.

32. The invention as set forth in claim 31 wherein the upwardly facing surface of the support frame provides primary support for the containers.

33. The invention as set forth in claim 31 wherein the support frame further comprises a forward panel terminating at an upper edge, said upper edge defining a forward load-bearing surface, and wherein the corresponding outer end wall includes a downwardly facing ledge portion supported on said upper edge.

34. The invention as set forth in claim 31 wherein the capacity of the portion of the containers above the load-bearing surface is substantially greater than the capacity below said surface.

35. In an agricultural implement having a main frame, container structure for containing granular material, said container structure comprising:
 a support frame connected to the main frame and extending upwardly therefrom to a generally horizontal support portion, the support frame opening inwardly and downwardly from the horizontal support portion; and
 flexible hopper structure including a pair of elongated flexible containers, each container including a lower funnel-shaped portion and an upper container portion having a material-containing capacity substantially greater than the funnel-shaped portion, each said flexible container including a downwardly directed portion located between the upper and lower container portions and supported on the horizontal support portion with the lower portion extending downwardly through the support frame opening, said support frame maintaining the pair of containers in adjacent end-to-end relationship, and wherein each upper container portion has upright sidewalls, the sidewalls being concave outwardly to approximate with shape of said upper container portion when filled with material.

36. The invention as set forth in claim 35 further comprising meter support structure connected to the implement frame, and wherein the funnel-shaped portion of each container is fixed to the meter support structure, and the downwardly directed portion of each container freely rests on the horizontal support portion thereby permitting each container to flex.

37. In an agriculture seeding and fertilizing implement having a frame and metering and distributing structure for applying seed and fertilizer to the soil, container structure for individually containing the seed and fertilizer, and for delivering the same to the metering and distributing structure, said container structure comprising:
 a support frame connected to the implement frame and extending upwardly therefrom to a generally continuous horizontal ledge portion substantially rectangular in shape and opening downwardly and inwardly, said ledge portion located above and generally centered with respect to the metering structure;
 a first flexible container having an outer end portion and an opposite inner end portion including a concave wall substantially closing the opposite end, and side portions connecting the end portions and defining a funnel-shaped lower portion extending downwardly and converging toward the inner end portion to a first material outlet;
 a second flexible container having an outer end portion and an opposite inner end portion including a convex wall of shape complementary to the concave wall of the first container to permit nesting of said containers, and side portions connecting the end portions of the second container and defining a funnel-shaped lower portion extending downwardly and converging toward the inner end portion of the second container to a second material outlet;
 wherein said first and second containers include downwardly directed ledge structure adjacent upper ends of the funnel-shaped lower portions, said ledge structure freely resting on the horizontal ledge portion and supporting the containers in nested relationship on said ledge portion with the funnel-shaped portions extending downwardly to the metering structure and the first and second material outlets opening into the metering structure, said freely resting ledge structure preventing substantial vertical movement of the nested containers while permitting the containers to flex; and
 wherein the containers include upper, dome-shaped portions with outwardly convex walls extending outwardly beyond vertical planes extending through the horizontal ledge portion.

38. The invention as set forth in claim 37 wherein the first and second containers are molded from cross-linked polyethylene.

39. The invention as set forth in claim 37 wherein the containers when nested on the support frame define an upright connecting joint, and wherein the container structure is symmetrical about the joint.

40. The invention as set forth in claim 39 wherein the material-containing capacity of the first container is substantially less than that of the second container.

41. The invention as set forth in claim 37 including means for connecting the funnel-shaped portions to the metering structure.

42. The invention as set forth in claim 37 wherein the downwardly directed ledge structure of the nested containers defines a generally continuous, rectangularly shaped horizontal ledge conforming to the shape of the horizontal ledge portion.

43. The invention as set forth in claim 42 wherein the downwardly directed ledge structure freely rests on the horizontal ledge portion to prevent substantial vertical movement of the nested containers while permitting the containers to flex thereon.

44. The invention as set forth in claim 37 wherein the material-containing capacity of the upper, dome-shaped portions is greater than that of the funnel-shaped portions.

45. The invention as set forth in claim 37 including sealing means located between the nested compartments for preventing moisture from entering the metering structure.

46. The invention as set forth in claim 47 wherein the container structure is fabricated by connecting the complementary-shaped inner ends of the containers together and thereafter lowering the connected containers as a unit onto the horizontal ledge portion of the support frame.

* * * * *

UNITED STATES PATENT AND TRADEMARK OFFICE
CERTIFICATE OF CORRECTION

PATENT NO. : 4,541,549
DATED : 17 September 1985
INVENTOR(S) : Howard C. Hadley et al It is certified that error appears in the above-identified patent and that said Letters Patent is hereby corrected as shown below:

```
Column 7, line 2, change "end" to -- ends --;
Column 8, line 66, (appears to be line 67), change
   "thereof" to -- thereon --;
Column 9, line 39, change "with" to -- the --; and
Column 10, line 60, change "47" to -- 37 --.
```

Signed and Sealed this

Twenty-ninth Day of July 1986

[SEAL]

Attest:

DONALD J. QUIGG

Attesting Officer

Commissioner of Patents and Trademarks